Nov. 8, 1932.                G. E. ZAHN                1,886,774
                    HYDRAULIC TRANSMISSION DEVICE
                    Filed Dec. 27, 1930        2 Sheets-Sheet 1
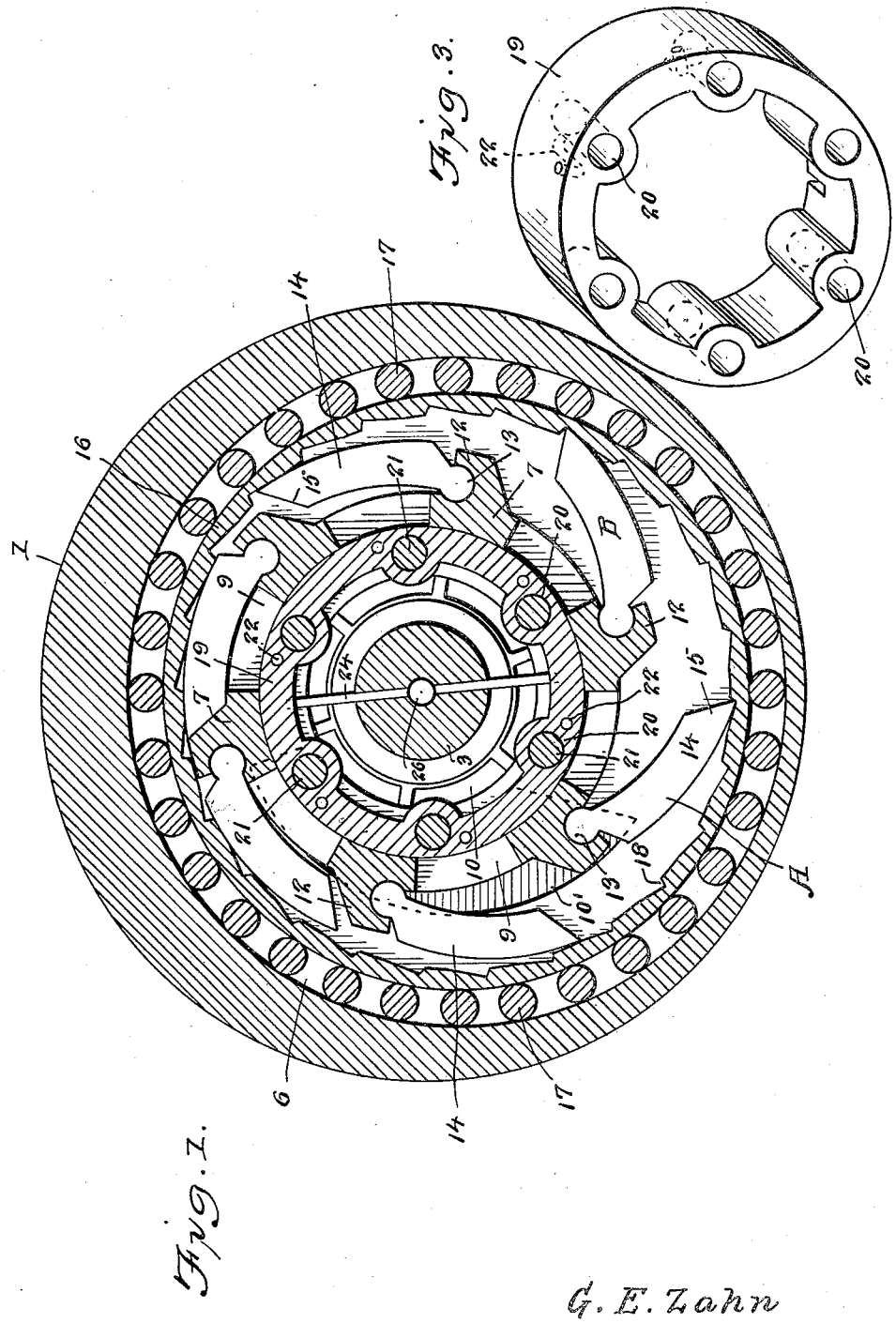
G. E. Zahn
INVENTOR

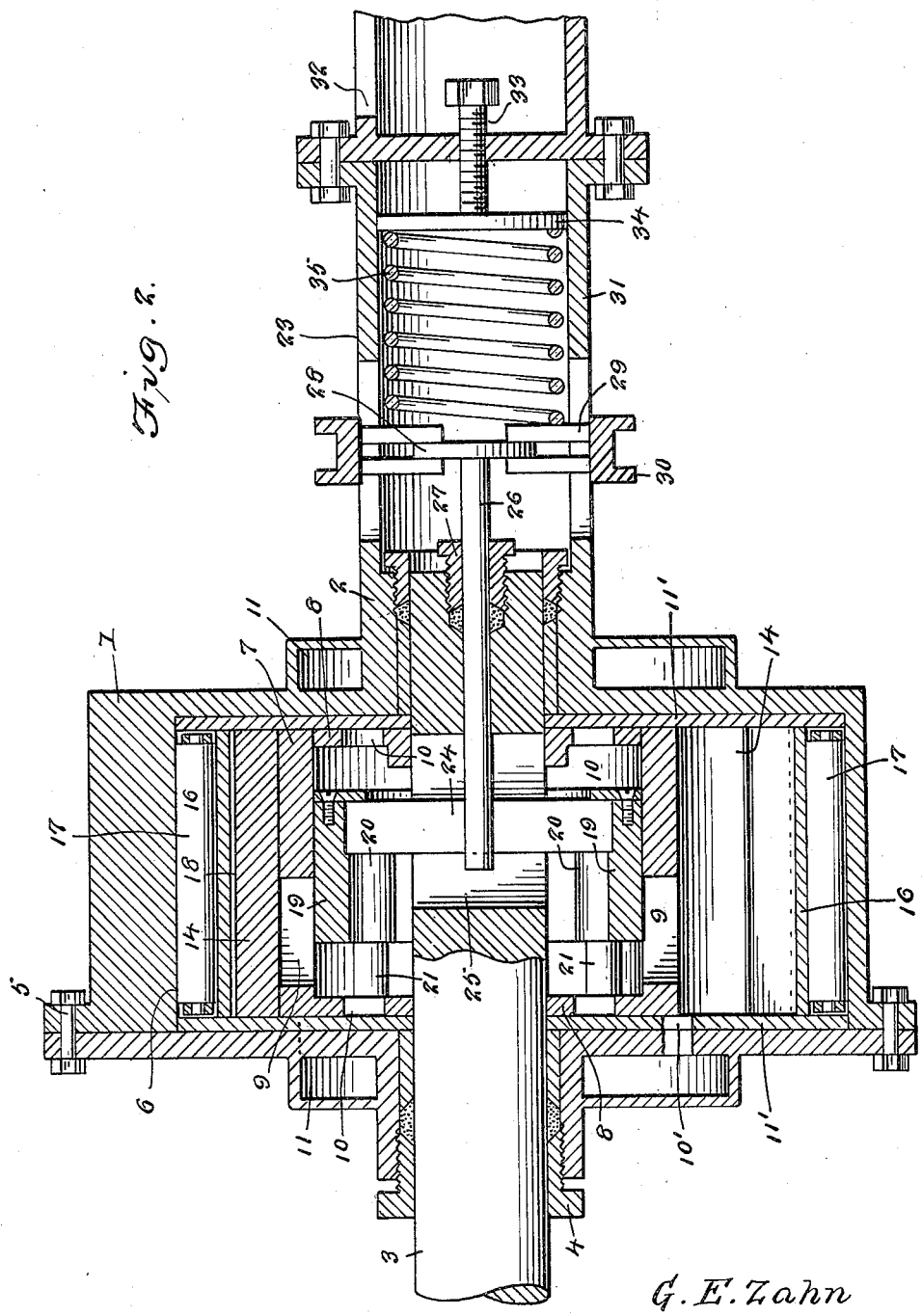

Patented Nov. 8, 1932

1,886,774

UNITED STATES PATENT OFFICE

GEORGE EUGENE ZAHN, OF FREEDOM, PENNSYLVANIA

HYDRAULIC TRANSMISSION DEVICE

Application filed December 27, 1930. Serial No. 505,152.

This invention relates to hydraulic transmission devices forming the subject-matter of my co-pending application, filed September 9, 1929, Serial No. 391,263, and has for the primary object, the provision of an automatic control valve to deliver constant torque to a driven device from a power shaft or source and capable of regulating the speed of rotation of the driven device according to the load or resistance thereto.

Another object of this invention is the provision of means whereby the action of the automatic valve may be varied to accommodate the device for operation in conjunction with varying loads to the driven device.

With these and other objects in view as will become more apparent as the description proceeds, the invention consists in certain novel features of construction, combination and arrangement of parts, as will be hereinafter more fully described and claimed.

For a complete understanding of my invention, reference is to be had to the following description and accompanying drawings, in which—

Figure 1 is a transverse sectional view illustrating a control valve for a hydraulic device constructed in accordance with my invention.

Figure 2 is a longitudinal sectional view illustrating the automatic control for the valve.

Figure 3 is a perspective view illustrating the valve.

Referring in detail to the drawings, the numeral 1 indicates a casing or housing forming a part of a driven device and has arranged in its side walls bearings or journals 2 which are located concentrically of said housing or casing and rotatably receive a power shaft 3. Suitable packing glands 4 are provided in the journals 2 to establish leakproof connection between said journals and the power shaft 3. One side of the housing or casing is removable as shown at 5 and the casing or housing is provided with an eccentric chamber 6 in which is placed fluid.

A cylindrical drive member 7 has the ends thereof closed by end walls 8 fixed to the power shaft 3 within the chamber 6 and is provided with relatively spaced ports 9 in the periphery thereof and the end walls 8 are provided with slots 10 establishing communication between the interior of the chamber 7 and the chamber 6 and also by-pass chambers 11 formed on the casing or housing 1 about the journals 2 by arcuate shaped ports 10' in wear plates 11'. Projections or ears 12 are formed on the periphery of the drive member 7 and are socketed to receive the rounded ends 13 of arcuate shaped wings 14, the free ends of which are bevelled as shown at 15. The free ends of the wings 15 ride against the inner periphery of an annular ring or piston 16 located in the chamber 6 and has interposed between the outer periphery thereof and the wall of the chamber 6 anti-friction means 17 in the form of rollers or ball bearings.

The inner periphery of the ring or piston 16 is provided with spaced grooves or notches 18 to be engaged by the free ends of the wings 15 during the operation of the device which will be hereinafter more fully described.

A cylindrical valve 19 is slidably mounted within the drive member 7 for controlling the passage of fluid through the ports 9, it being understood that the ports 9 establish communication between the interior of the drive member 7 and the chamber 6 between certain of the wings during the operation of the device. The valve 19 is provided with a plurality of cylinders 20 which open outwardly through one end of the valve to receive stationary pistons 21 carried by one of the side walls of the drive member 7 and the inner ends of the cylinders are in communication with passages 22 formed in the valve and opening outwardly through the periphery thereof for communication with the ports 9 so that the pressure within the member 7 and ports 9 will act against the pistons to cause the valve 19 to act against a control means 23.

The valve 19 is provided with a bar or head 24 slidable in a slot 25 in the power shaft 3 and is connected with a rod or stem 26 extending through one end of the power shaft as clearly shown in Figure 2 and is engaged by a stuffing box 27. The stem or rod 26 carries a head or disk 28 received between spaced members 29 formed on a grooved control member 30 which is slidably mounted on an extension 31 forming an integral part of one of the journals 2. When it is desired to operate the valve 19 manually, a suitable control (not shown) is attached to the member 30 whereby the position of the valve may be varied relative to the ports 9, or if desired the valve 19 may be controlled by some other outward mechanism, actuated electrically or otherwise.

To permit the casing or housing 1 to idle relative to the rotation of the power shaft 3, the valve 19 is positioned to permit the fluid to freely circulate through the ports 9. To cause rotation of the casing or housing 1 in unison with the power shaft 3, the valve 19 is positioned to close the ports 9, causing fluid to be trapped between a certain pair of wings 14, which trapped fluid exerts pressure in all directions and will bind the piston or ring 16 against the wall of the chamber 6 with such force that movement of the ring or piston relative to the casing or housing 1 is prevented.

By reference to Figure 1 it will be seen that the device rotates in a counter-clock-wise direction and the two lowermost wings which are in engagement with the notches 18 of the ring or piston 16 form a chamber in which the fluid pressure is built up. When the casing or housing 1 is idle or rotating at a slower rate of speed than the power shaft 3, the piston or ring 16 moves faster than the shaft 3 owing to the arrangement of the wings within the eccentric chamber 6. It will be noted that the wing A is the lowermost wing of the group of wings in Figure 1 and moves in the arc of a circle when advancing from the position shown to the position occupied by the wing B which causes the piston or ring 16 to rotate or advance a little more rapidly than the power shaft 3. The wing A in the position shown in Figure 1 occupies a position wherein the free end is disposed outwardly a greater distance than the free ends of the remaining wings and as the respective wing advances toward the position B, the free end thereof swings inwardly and this inward movement causes a faster rotation of the ring or piston 16 than the rotation of the power shaft 3, consequently the remaining wings ratchet over the ring or piston 16 or slightly lag behind the said ring or piston 16.

By reference to Figure 1 it will be seen that the uppermost wings are forced inwardly and lie in close proximity to the outer periphery of the drive member 7, and as the respective wings arrive opposite the slots 10 and due to the centrifugal force and the shape of the chamber 6 swing outwardly of the drive member and engage a notch or groove 18 when arriving at the position occupied by the wing A in Figure 1 permitting fluid that has entered from the ports 10 to be trapped between a pair of wings and the walls of the device that pressure will be built up to exert sufficient force against the piston or ring to cause binding of the latter against the walls of the chamber 6 and establish a driving connection between the casing or housing 1 and the drive member 7 providing that the valve is positioned to close the ports 9.

The automatic control 23 is employed in conjunction with this device, when the casing or housing 1 is to rotate in unison with the power shaft 3 up to a predetermined load or resistance thereon, and when the load or resistance increases beyond the determined amount, the pressure within the device increases the pressure through the passages 22 and shifts the valve 19 endwise against the action of the automatic control opening ports 9 to permit the pressure to decrease. The reduction in the pressure permits the casing or housing 1 to rotate at a slower rate of speed than the power shaft 3 by the ring or piston 16 slipping relative thereto.

The automatic control includes a support 32 fastened to the extension 31 and carries an adjusting member or bolt 33 provided with a head 34 engaging one end of a coiled expansion spring 35, the other end of which bears against the spaced members 29 connected to the head 28 of the member or rod 26. The adjusting member 23 may be actuated to place the spring 35 under varying tensions or capable of causing the spring to withstand varying pressures from the valve 19 during the operation of the device automatically. It will therefore be seen that when the load or resistance again arrives at the predetermined amount, the spring 35 will urge the valve 19 to close the ports 9 to permit the pressure again to be built up sufficiently to lock the casing 1 for rotation with the drive member 7 according to the predetermined load.

While I have shown and described the preferred embodiment of my invention it will be understood that minor changes in construction, combination and arrangement of parts may be made without departing from the spirit and scope as claimed.

Having thus described my invention, what I claim is:—

1. A fluid transmission including a fluid casing forming a part of a driven device and a power shaft extending into the casing concentrically thereof, said casing having an eccentrically located chamber in which the shaft is eccentrically located, a rotary element engaging the wall of said chamber and having spaced grooves, a drive element secured to the shaft, wings pivoted to the drive element to successively engage the grooves of the rotary element during the rotation of the drive element, a control valve to trap fluid between the walls of the chamber and a pair of the wings to build up varying pressures of fluid to cause rotation of the casing by the shaft through the rotary element at variable speeds, and automatic means associated with the valve for controlling the amount of pressure between said pair of wings to permit the casing to rotate at a slower rate of speed than the shaft when the load on the casing increases beyond a determined amount.

2. A fluid transmission including a fluid casing forming a part of a driven device and a power shaft extending into the casing concentrically thereof, said casing having an eccentrically located chamber in which the shaft is eccentrically located, a rotary element engaging the walls of said chamber and having spaced grooves, a drive element secured to the shaft, wings pivoted to the drive element to successively engage the rotary element and the grooves thereof during rotation of the drive element, a control valve to trap fluid between the walls of the chamber and a pair of wings to build up varying pressures of fluid to rotate the casing from the shaft through the rotary element, a tension means for urging the valve toward closed position, said valve having cylinders in communication with the chamber, non-movable pistons in said cylinders to cause the valve to move against said tension means and toward an open position when the pressure of fluid between said wings increases beyond a determined amount.

3. A fluid transmission including a fluid casing forming a part of a driven device and a power shaft extending into the casing concentrically thereof, said casing having an eccentrically located chamber in which the shaft is eccentrically located, a rotary element engaging the walls of said chamber and having spaced grooves, a drive element secured to the shaft, wings pivoted to the drive element to successively engage the rotary element and the grooves thereof during rotation of the drive element, a control valve to trap fluid between the walls of the chamber and a pair of wings to build up varying pressures of fluid to rotate the casing from the shaft through the rotary element, an adjustable tension means for urging the valve toward closed position, said valve having cylinders in communication with the chamber, non-movable pistons in said cylinders to cause the valve to move against said tension means and toward an open position when the pressure of fluid between said wings increases beyond a determined amount.

In testimony whereof I affix my signature.

GEORGE EUGENE ZAHN.